UNITED STATES PATENT OFFICE.

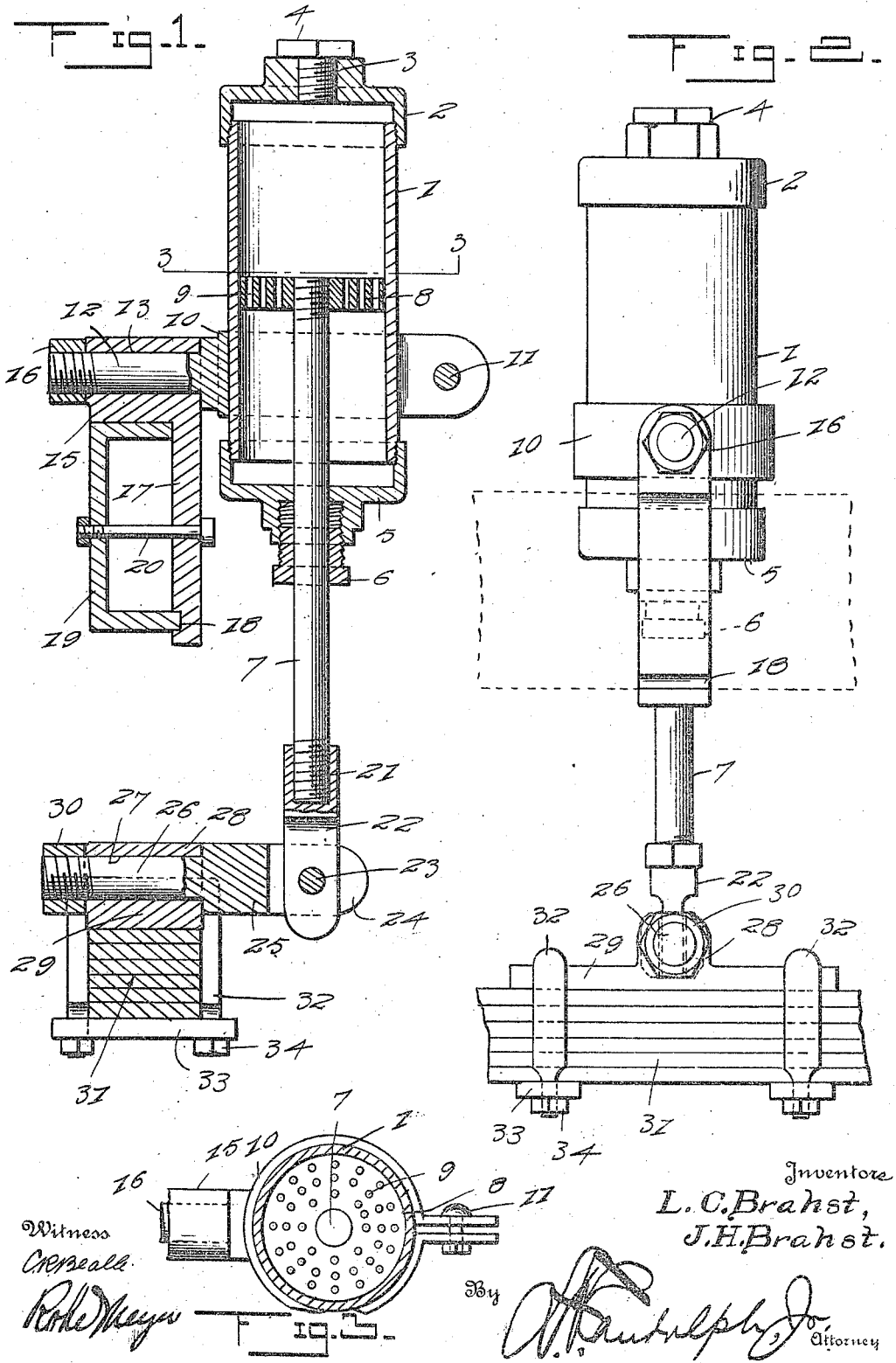

LOUIS C. BRAHST AND JULIUS H. BRAHST, OF HOBART, INDIANA.

SHOCK-ABSORBER FOR MOTOR-VEHICLES.

1,233,969.　　　　　Specification of Letters Patent.　　　Patented July 17, 1917.

Application filed June 13, 1916. Serial No. 103,471.

*To all whom it may concern:*

Be it known that we, LOUIS C. BRAHST and JULIUS H. BRAHST, citizens of the United States, residing at Hobart, in the county of Lake and State of Indiana, have invented certain new and useful Improvements in Shock-Absorbers for Motor-Vehicles; and we do hereby declare the following to be a full, clear, and exact description of the invention, such as will enable others skilled in the art to which it appertains to make and use the same.

This invention relates to shock absorbers for attachment to vehicles, for relieving the springs thereof, and more particularly to a shock absorber designed for motor vehicles, which absorber is constructed for permitting the vehicle springs to contract without undue resistance and to retard the rebound of the same for the purpose of absorbing shocks occasioned to the vehicle.

An object of this invention is to provide a construction for connecting the shock absorber to the frame work and spring of a motor vehicle so as to eliminate the liability of damage to the shock absorber by the swaying of the vehicle body.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:—

Figure 1 is a section through the improved shock absorber showing parts in elevation.

Fig. 2 is an edge view of the shock absorber, and

Fig. 3 is a view taken on the line 3—3 of Fig. 1.

Referring more particularly to the drawing, 1 designates the cylinder of the shock absorber which is provided for retaining oil and which has a cover or closure cap 2 removably mounted upon its upper end. The closure cap 2 is provided with an opening 3 extending therethrough to permit of the filling of the cylinder with oil, and a plug 4 normally forms a closure for the opening 3.

A removable head or end piece 5 is attached to the end of the cylinder remote from the cap 2 and it has a stuffing box 6 carried thereby through which the piston rod 7 travels. The piston rod 7 has a piston 8 mounted upon its upper end which is positioned interiorly of the cylinder 1. The piston is provided with a plurality of openings 9 which permit the oil to pass through the piston during the operation of the shock absorber.

The cylinder 8 has a split ring 10 mounted thereabout and clamped thereon in the usual manner by means of a bolt 11. A pin 12 is formed upon the split ring 10 and it is rotatably seated in a recess 13 formed in a block 15. A nut 16 is mounted upon the end of the pin 12 for preventing its longitudinal movement in the recess or bore 13. The block 15 has a depending plate 17 formed thereupon which is recessed as shown at 18. The plate 17 is provided for abutting engagement with one side of a portion of the frame work of a motor vehicle as indicated at 19, and it is connected thereto through the medium of a bolt 20. The lower surface of the block 15 rests upon a portion of the upper surface of the frame work 19 of the motor vehicle, and securely connects the cylinder 1 to the frame work of the vehicle so as to permit of an oscillatory movement of the cylinder utilizing the pin 12 as an axle.

The piston rod 7 has its lower end detachably connected as shown at 21 to a link 22, which link is in turn pivotally connected as shown at 23 to the bifurcated end 24 of a bar 25. The bar 25 has a pin 26 formed thereupon which pin is rotatably seated in a bore 27 formed in the upstanding portion 28 of a plate 29. The upstanding portion 28 is formed upon the upper surface of the plate 29 substantially equi-distant of its ends, as clearly shown in Fig. 2 of the drawing. The pin 26 is held against longitudinal movement within the bore 27 by a nut 30 which is mounted upon the end of the pin and projects through the upstanding portion 28. The plate 29 is attached to the upper surface of the springs of the vehicle, as indicated at 31 by clips 32, the upper portions of which extend across the upper surface of the plate 29 and the lower ends of which are connected to plate 33, as indicated at 34. The plate 33 extends across beneath the spring 31. The provision of the pins 12 and 26 and the pivotal connection at 23 between the link 22 and the bar 25 will permit of movement of the cylinder 1 and piston rod 7, independent of the motor vehicle to which it is attached, and thereby decrease the liability of breaking the shock absorber upon sidewise swaying movement of the vehicle when running fast or over uneven roads. The provision of the various joints also insures the continuous operation of the shock absorber under all conditions, and eliminates binding or bending of the piston rod and binding of the piston head within the cylinder.

The function of the piston 8 is to retard sudden movement of the springs of a vehicle by the resistance offered to the flow of oil, contained within the cylinder, through the perforations of the piston.

In reducing the invention to practice, certain minor features of construction, combination and arrangement of parts may necessitate alterations to which the patentee is entitled provided such alterations are comprehended within the scope of what is claimed.

What is claimed is:—

The combination with an automobile including a chassis constructed from channel iron and a spring, of a cylinder, a piston operable in the cylinder, a split ring secured to the cylinder, a pin formed on the split ring, a plate journaled on the pin and resting upon the upper horizontal portion of the channel iron of the chassis, a downwardly depending plate formed upon the first mentioned plate and having a recess to receive the lower horizontal portion of the channel iron of the chassis, a bolt extending through the second plate and the chassis, a link detachably secured to the piston, a bolt pivoted to the link, a plate positioned upon the spring, substantially U-shaped clamps securing the third mentioned plate upon the spring, and an offset portion formed upon the third mentioned plate at a point intermediate its ends and provided with a bore to rotatably receive the second mentioned pin.

In testimony whereof we affix our signatures in presence of two witnesses.

LOUIS C. BRAHST.
JULIUS H. BRAHST.

Witnesses:
 JOHN M. STOCKER,
 ESTHER NYGREN.